US010749706B2

(12) United States Patent
Bender et al.

(10) Patent No.: US 10,749,706 B2
(45) Date of Patent: Aug. 18, 2020

(54) LOCAL INTERCONNECT NETWORK BUS ARCHITECTURE

(71) Applicant: Melexis Technologies NV, Tessenderlo (BE)

(72) Inventors: Michael Bender, Erfurt (DE); Philip Mckenna, Commerce Township, MI (US); Thomas Freitag, Plaue (DE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days.

(21) Appl. No.: 15/622,117

(22) Filed: Jun. 14, 2017

(65) Prior Publication Data

US 2017/0359195 A1 Dec. 14, 2017

(30) Foreign Application Priority Data

Jun. 14, 2016 (EP) ..................................... 16174384

(51) Int. Cl.
*H04L 12/40* (2006.01)
*H04L 12/403* (2006.01)

(52) U.S. Cl.
CPC ...... *H04L 12/40006* (2013.01); *H04L 12/403* (2013.01); *H04L 2012/40234* (2013.01); *H04L 2012/40273* (2013.01)

(58) Field of Classification Search
CPC ......................... H04L 12/40006; H04L 12/403
USPC .............................................................. 710/1
See application file for complete search history.

(56) References Cited

U.S. PATENT DOCUMENTS

| | | | | |
|---|---|---|---|---|
| 5,983,306 A | * | 11/1999 | Corrigan | G06F 12/0866 710/310 |
| 6,286,067 B1 | * | 9/2001 | James | H04L 12/2832 709/220 |
| 7,091,876 B2 | | 8/2006 | Steger | |
| 8,706,933 B2 | * | 4/2014 | Pimputkar | B23Q 1/265 709/222 |
| 9,965,636 B2 | * | 5/2018 | Litichever | G06F 21/604 |
| 2006/0041350 A1 | * | 2/2006 | Hoshaw | B60R 25/00 701/36 |

(Continued)

FOREIGN PATENT DOCUMENTS

DE 102013201471 A1 7/2014
EP 1490772 B1 6/2005

OTHER PUBLICATIONS

Extended European Search Report from EP Application No. EP16174384.4, dated Sep. 15, 2016.

(Continued)

*Primary Examiner* — Paul R. Myers
(74) *Attorney, Agent, or Firm* — Workman Nydegger

(57) ABSTRACT

The present invention relates to an integrated circuit device for controlling LIN slave nodes based on a control signal transmitted by a LIN master control device. The IC device comprises a slave node circuit for processing the control signal when received in the form of a LIN message frame via a first data line terminal. The IC device also comprises a master node circuit for processing further control signals to be transmitted in the form of LIN message frames via a second data line terminal to the LIN slave nodes. The IC device also comprises a processing unit for controlling the LIN slave nodes based on the control signal by composing the further control signals.

14 Claims, 6 Drawing Sheets

(56) References Cited

U.S. PATENT DOCUMENTS

| | | | |
|---|---|---|---|
| 2007/0152870 A1* | 7/2007 | Woodington | G01S 7/414 342/70 |
| 2007/0168580 A1* | 7/2007 | Schumacher | G06F 13/385 710/30 |
| 2008/0304499 A1* | 12/2008 | Jeon | H04L 12/66 370/401 |
| 2010/0082181 A1* | 4/2010 | Ando | H04L 12/40013 701/1 |
| 2011/0018441 A1* | 1/2011 | Tanaka | B60Q 1/0094 315/82 |
| 2013/0057339 A1* | 3/2013 | Koudar | G06F 13/4252 327/565 |
| 2014/0081518 A1 | 3/2014 | Son | |
| 2014/0133350 A1 | 5/2014 | Triess et al. | |
| 2014/0189187 A1* | 7/2014 | Acharya | G06F 13/385 710/310 |
| 2014/0334568 A1* | 11/2014 | Gotou | H04L 27/10 375/271 |
| 2015/0117463 A1* | 4/2015 | Nelsen | H04L 12/4625 370/402 |
| 2015/0200789 A1* | 7/2015 | Jiang | H04L 12/40006 370/463 |
| 2016/0080533 A1* | 3/2016 | Jeon | H04L 12/6418 370/402 |
| 2016/0105513 A1* | 4/2016 | Bauman | H04L 67/34 370/254 |
| 2016/0373238 A1* | 12/2016 | Samuel | H04L 7/0012 |
| 2017/0063700 A1* | 3/2017 | Wang | H04L 47/25 |

OTHER PUBLICATIONS

"Lin Specification Package Revision 2.2A", www.lin-subbus.org, Dec. 31, 2010, 194 Pages.

* cited by examiner

FIG 1 – PRIOR ART

LOCAL INTERCONNECT NETWORK BUS ARCHITECTURE

FIELD OF THE INVENTION

The invention relates to the field of electronic devices for data communication via a serial network bus system, and more specifically to electronic devices and systems conforming to the Local Interconnect Network (LIN) bus standard and related methods.

BACKGROUND OF THE INVENTION

The Local Interconnect Network (LIN) bus standard is an open protocol defined for use in communicating between a number of distributed modules. Such communication standards may typically refer to systems in which a plurality of similar modules are used on a common bus line, and in which each module may need to be addressed individually. A LIN bus system may comprise a master node that is connected via a wired connection, e.g. by a single data wire forming a common signal conductor, to at least one slave node. Thus, the master node and slave node(s), connected by the data wire, form a network cluster. These slave devices may form control components associated with identical and/or different functions to be controlled by the master device. For example, such functions that can be controlled by a LIN data bus system, as known in the art for automotive applications, are window lifting, seat heating, motor control or power generation.

Particularly, the LIN bus is a serial bus that is often, but not exclusively, used in automotive applications. For example, such an application may be a low-end, e.g. relatively cheap and easy to implement, sensor network in a vehicle, e.g. a network connecting multiple sensors and/or actuators to a master node in a vehicle. Each module in the cluster may have a unique identity, represented by an ID code, which may be programmed as a unique identifier in the node or assigned to the node by an auto-addressing method, as known in the art. This unique identity enables the master node to communicate with a selected slave node or a selected group of slave nodes.

The LIN bus provides a communication architecture for bidirectional exchange of data between the master node, on one hand, and each slave node, on the other hand. Each module may contain an interface circuit, which may be implemented as a single integrated circuit for providing the functionality of the module, and in which this interface circuit is adapted for interfacing with the common signal conductor and for implementing the protocols associated with the messages and responses exchanged via the LIN bus.

However, in a LIN bus system as known in the art, the maximum number of nodes associated with a single bus may be restricted to 16 nodes, e.g. due to the protocol definitions pertaining to the physical layer and/or due to the capacitive load on the network. For example, the LIN physical layer specification, revision 2.0, clearly states that the number of nodes in a cluster should not exceed 16, in order to prevent that the network impedance could prohibit fault-free communication under worst case conditions, for example due to a presumed lowering of about 3% of network resistance by each additional node.

Nonetheless, particular applications may require cluster sizes that comprise a larger number of modules. For example, in an automotive application such as control signal communication for interior ambient lighting, a cluster size in the range of twenty to fifty nodes may be commonly required. Furthermore, the number of nodes to be preferably included in a cluster may go up to two hundred nodes, or even higher, for particular applications.

It is known in the art to control a plurality of devices, e.g. lights, by a single electronic control module, which may be slave node in a bus network. However, such direct control, as known in art, may require a dedicated control wire for each controlled device connecting to the control module, and may thus have a disadvantageous cost, system complexity, resistive losses and/or interference risk associated therewith due to the wires and connectors required.

For example, as shown in FIG. 1, in an automotive interior lighting system, as known in the art, each LIN slave node 102 may control a three-coloured light emitting diode light (LED) 101, e.g. a red-green-blue colour triplet LED (RGB-LED). Thus, each LIN slave node 102 may receive information associated with a selected colour and brightness from a central electronic control unit (ECU) 103 acting as a master node, via the LIN Bus, and may be adapted for returning diagnostic information to the master node.

Therefore, it is desirable to implement a larger number of nodes in a single LIN bus cluster, e.g. more than 16 nodes per cluster. Approaches known in the art to connect more than 16 nodes in a single network may have various disadvantages, such as a high system cost for a central electronic control unit (ECU) that is specifically adapted for acting simultaneously as a master node 103 on a plurality of separate LIN buses 104, as shown in FIG. 1, in which each of these LIN subnetworks 104 conforms to a maximum of 15 slave nodes.

A high cost of such system may be, at least partially, associated with the additional requirements for supporting multiple input and output (I/O) ports, higher memory requirements and more advanced and/or faster processing capabilities to determine the correct interface connection for routing a particular message and for handling inbound and outbound traffic on multiple busses simultaneously. For example, the central ECU 103 may be required to calculate and manage all information for all connected light sources, to coordinate the control of each and every connected light. This may generate a high protocol load, e.g. dense message traffic, as each slave node 102 will receive its light control information from the central ECU and may also transmit diagnostic information towards the central ECU in return.

Furthermore, due to the large number of wired connections of the ECU that are required to control multiple LIN buses, electromagnetic compatibility (EMC) issues may arise due to electric field coupling, e.g. capacitive coupling, between the wires. While such EMC issues could be resolved by including additional decoupling capacitors, this would also disadvantageously increase the system. The EMC issues may need to be solved by additional capacitors thereby increasing the total system cost. Moreover, the space requirements for the wire harness, particularly in the direct vicinity of the central ECU, may be high, such that other design parameters may be disadvantageously affected, e.g. introducing constraints in mechanical design.

SUMMARY OF THE INVENTION

It is an object of embodiments of the present invention to provide devices and methods for allowing a large number of slave nodes, e.g. more than 15 slave nodes, to be connected to a single master node via a single, connected LIN bus network architecture, e.g. without introducing a requirement for more data line ports on the master node for an increasing number of slave nodes.

The above objective is accomplished by a method and device according to the present invention.

It is an advantage of embodiments of the present invention that a single LIN bus master module can be connected to more than 15 LIN bus slave modules, e.g. operably connected such as to allow control of the more than 15 LIN bus slave nodes by the single LIN bus master node.

It is a further advantage of embodiments of the present invention that the single LIN bus master module can be operably connected to the more than 15 LIN bus slave modules while only requiring a single data communication wire connection, e.g. a single data port, on the master module.

It is another advantage of embodiments of the present invention that a cheap means for connecting a large number of slave modules to a network is provided. For example, it is an advantage of LIN buses, for both communication to the slave devices as for communication to a bus master module, that it is a cheap networking solution, e.g. only requiring a single wire for communication per LIN bus.

In a first aspect, the present invention relates to an integrated circuit (IC) device for controlling a plurality of LIN slave nodes based on a control signal transmitted by a LIN master control device. The IC device comprises a slave node circuit that comprises a first data line terminal, for connecting to a first LIN data line, and a first LIN protocol controller operably connected to the first data line terminal. This slave node circuit is adapted for processing the control signal when received in the form of a LIN message frame via the first data line terminal.

The IC device further comprises a master node circuit that comprises a second data line terminal, for connecting to a second LIN data line, and a second LIN protocol controller operably connected to the second data line terminal. This master node circuit is adapted for processing further control signals to be transmitted in the form of LIN message frames via the second data line terminal to the plurality of LIN slave nodes.

The IC device also comprises a processing unit for controlling the plurality of LIN slave nodes based on the control signal, wherein this controlling of the plurality of LIN slave nodes comprises composing the further control signals.

An IC device in accordance with embodiments of the present invention may comprise at least one load terminal for connecting to a local electrical load to be controlled, and the processing unit may furthermore be adapted for controlling a voltage and/or current to be supplied via the at least one load terminal in response to the control signal. For example, the IC device may be adapted for acting as a slave device, e.g. for performing a similar function as each of the plurality of LIN slave nodes.

In an IC device in accordance with embodiments of the present invention, the at least one load terminal may be adapted for driving at least one light emitting diode (LED), e.g. an RGB (red-green-blue) LED, e.g. a LED having a controllable color.

In an IC device in accordance with embodiments of the present invention, the processing unit may be adapted for controlling a sensor function and/or an electrical load connected to, or integrated in, each of the plurality of LIN slave nodes.

In an IC device in accordance with embodiments of the present invention, the processing unit may be adapted for controlling at least one light emitting diode driven by each of the plurality of LIN slave nodes.

In an IC device in accordance with embodiments of the present invention, the slave node circuit may further comprise a first physical layer LIN transceiver for interfacing between the first data line terminal and the first LIN protocol controller. The master node circuit may further comprise a second physical layer LIN transceiver for interfacing between the second data line terminal and the second LIN protocol controller.

In an IC device in accordance with embodiments of the present invention, the processing unit may be adapted for analysing status information received from the plurality of LIN slave nodes via the master node circuit, and relaying this status information to the LIN master control device via the slave node circuit.

An IC device in accordance with embodiments of the present invention may furthermore comprise a slave auto-addressing means for determining a unique identifier of the slave node circuit for use in communication traffic exchanged via the first data line terminal.

In an IC device in accordance with embodiments of the present invention, the master node circuit may be adapted for allowing the plurality of LIN slave nodes to be detected and/or assigned a corresponding network identifier automatically.

In a second aspect, the present invention also relates to a LIN bus system comprising a LIN bus and a plurality of nodes, the plurality of nodes comprising a LIN master control device, at least one integrated circuit device in accordance with embodiments of the first aspect of the present invention and a plurality of LIN slave nodes. This plurality of nodes are connected to the LIN bus such as to enable LIN message frames to be exchanged between the plurality of nodes. The LIN master control device is connected by a first LIN data line to the at least one integrated circuit device, and the (or each) at least one integrated circuit device is connected by a corresponding second LIN data line to at least some of the plurality of LIN slave nodes.

In a LIN bus system in accordance with embodiments of the present invention, the plurality of nodes may comprise more than 16 nodes.

A LIN bus system in accordance with embodiments of the present invention may comprise an electrical load connected to each LIN slave node and an electrical load connected to the at least one integrated circuit device in accordance with embodiments of the first aspect of the present invention. The electrical loads connected to the LIN slave nodes and the electrical loads connected to the at least one integrated circuit device may be substantially similar, e.g. correspond to different devices of same or equal construction, e.g. to light sources such as LEDs, e.g. RGB LEDs.

In a LIN bus system in accordance with embodiments of the present invention, a LIN slave node may be exchanged or interchanged with, e.g. the bus system may be adapted for enabling a LIN slave node to be exchanged or interchanged with, an integrated circuit device in accordance with embodiments of the first aspect of the present invention. Preferably, the integrated circuit device is adapted for performing the same function of the LIN slave node, e.g. driving at least one LED light, e.g. an RGB LED light, while also providing the functionality as described hereinabove.

In a LIN bus system in accordance with embodiments of the present invention, each LIN slave node and each of the at least one integrated circuit device may comprise at least one load terminal, each such at least one load terminal being adapted for driving at least one light emitting diode, e.g. an RGB LED. In a third aspect, the present invention also relates to a method for controlling a plurality of LIN slave nodes. This method comprises transmitting, using a LIN master control device, a control signal, in the form of a LIN message frame, via a first LIN data line to an integrated circuit device having a slave node circuit, a master node circuit and a processing unit. The method further comprises processing, using the slave node circuit, the control signal and composing, using the processing unit, at least a further control signal in response to the control signal. The method also comprises transmitting, using the master node circuit, the at least one further control signal in the form of at least a further LIN message frame to the plurality of LIN slave nodes via a second LIN data line.

A method in accordance with embodiments of the present invention may furthermore comprise a step of receiving, by the plurality of LIN slave nodes, the further control signal and controlling, by each of the plurality of LIN slave nodes, a corresponding electrical load connected to each LIN slave node in accordance with the further control signal.

A method in accordance with embodiments of the present invention may further comprise controlling an electrical load connected to the integrated circuit device, this controlling being in accordance with the control signal.

In a method in accordance with embodiments of the present invention, each electrical load connected to each LIN slave node and the electrical load connected to the integrated circuit device may have a similar or identical function.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
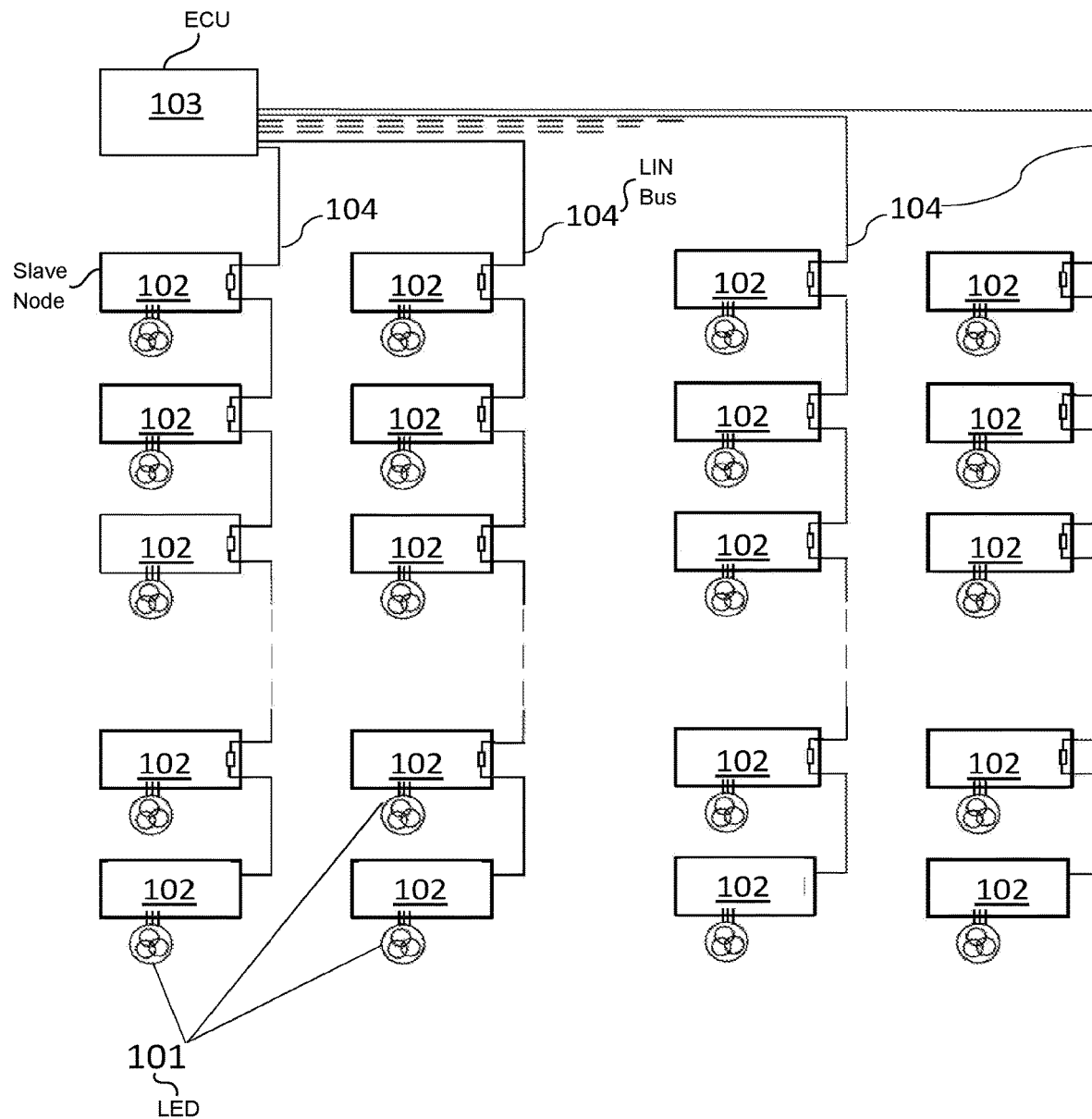
FIG. 1 shows a diagrammatic representation of ambient light architecture as known in the art.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Embodiments of the present invention relate to a gateway architecture for a local interconnect network (LIN) bus system, for use in, for example, automotive applications, such as automotive ambient light applications. An advantage of embodiments of the present invention is that limitations on the number of nodes in a LIN cluster, e.g. a maximum of 16 nodes in such cluster, can be easily and efficiently overcome without thereby incurring a high device or system cost. For example, a high system cost, mechanical constraints, a high bus protocol load and/or possible electromagnetic compatibility (EMC) issues may be avoided, alleviated or overcome by a device, system and/or method in accordance with embodiments of the present invention.

In a first aspect, the present invention relates to an integrated circuit device for controlling a plurality of Local Interconnect Network (i.e. "LIN") slave nodes based on a control signal transmitted by a LIN master control device. The integrated circuit device comprises a slave node circuit that comprises a first data line terminal for connecting to a first LIN data line and a first LIN protocol controller operably connected to the first data line terminal. The slave node circuit is adapted for, e.g. configured and/or programmed for, processing the control signal when received in the form of a LIN message frame via the first data line terminal. The integrated circuit device further also comprises a master node circuit that comprises a second data line terminal and a second LIN protocol controller operably connected to the second data line terminal. The master node circuit is adapted for, e.g. configured for and/or programmed for, processing further control signals to be transmitted in the form of further LIN message frames via the second data line terminal to the plurality of LIN slave nodes. The integrated circuit device comprises a processing unit for controlling the plurality of LIN slave nodes based on the control signal, in which controlling of the plurality of LIN slave nodes comprises composing the further control signals.

Figure 2:
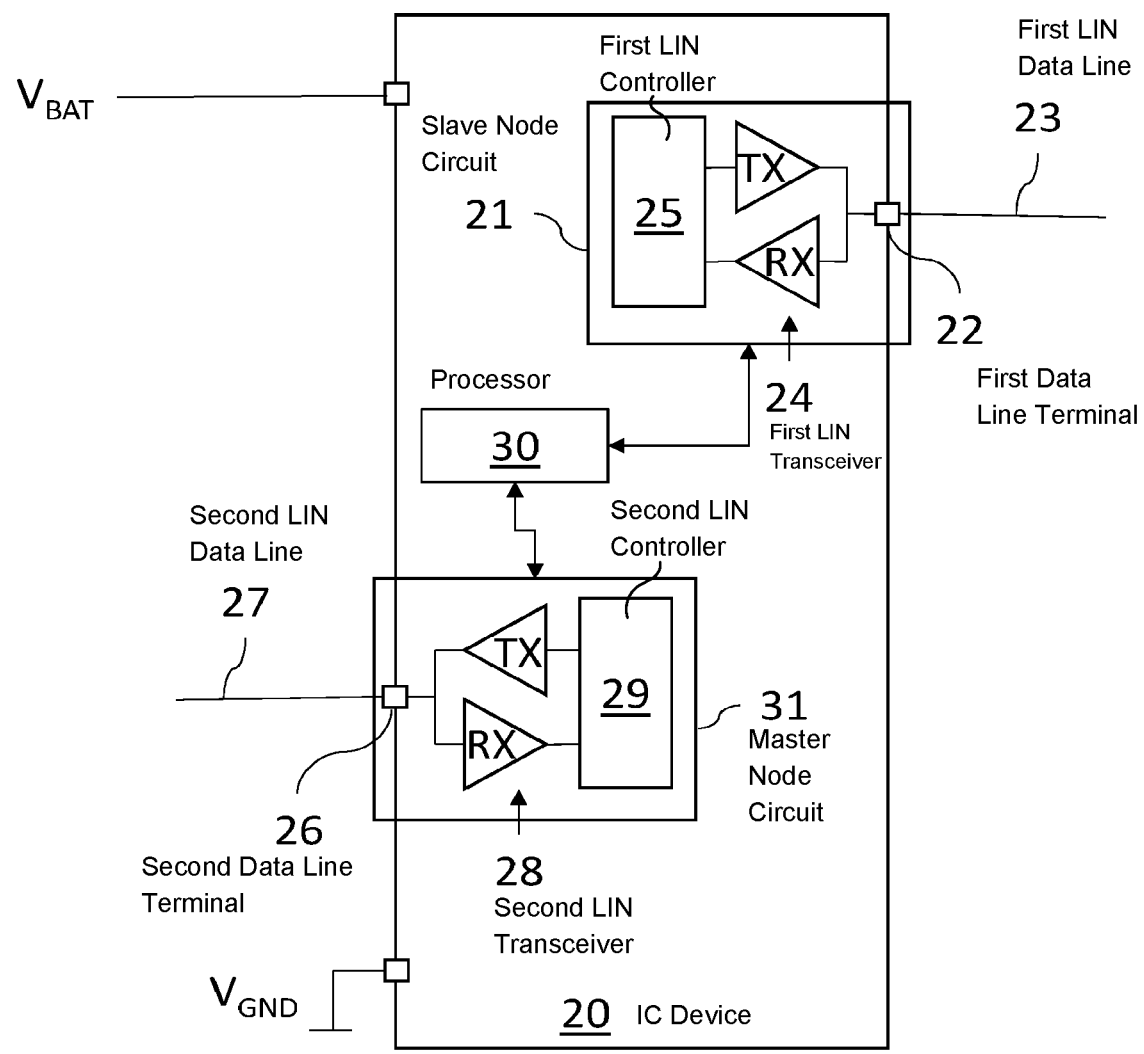
FIG. 2 shows, schematically, a device in accordance with embodiments of the present invention.

Referring to FIG. 2, an exemplary device in accordance with embodiments of the present invention is schematically shown. This integrated circuit (IC) device 20 is adapted for controlling a plurality of LIN slave nodes based on a control signal transmitted by a LIN master control device, e.g. a control signal received from a central ECU. The IC device 20 could also be referred to as a gateway device, as will be understood by the skilled person from the description herein below.

Thus, the integrated circuit device 20 may form part of a distributed control arrangement, e.g. the distributed control arrangement in accordance with embodiments of the second aspect of the present invention discussed further herein below. The LIN master control device may thus communicate on a single data bus with the integrated circuit device 20, a plurality of such integrated circuit devices 20, or a combination of slave devices and integrated circuit devices 20 in accordance with embodiments of the present invention. Each LIN slave node, or each LIN slave node and the integrated circuit device 20, may be adapted for connecting to an electrical load, such as an actuator, light, switch, heating element, cooling element, or other device to be controlled. However, alternatively or additionally, any or each of the LIN slave nodes may comprise a sensor and control logic, in software and/or hardware, to obtain information from the sensor and transmit this information to the integrated circuit device 20, and/or to control the electrical load connected thereto appropriately.

The IC device 20 comprises a slave node circuit 21. This slave node circuit 21 comprises a first data line terminal 22, e.g. a connection port of the IC device, for connecting to a first LIN data line 23, e.g. to a LIN data line to be used as the "single wire" for serially exchanging data in accordance with a LIN standard, and a first LIN protocol controller 25 operably connected to the first data line terminal (22). The slave node circuit 21 is adapted for processing the control signal, from the LIN master control device, when received in the form of a LIN message frame via the data line terminal 22.

In an IC device 20 in accordance with embodiments of the present invention, the slave node circuit 21 may further comprise a first physical layer LIN transceiver 24 for interfacing between the first data line terminal 22 and the first LIN protocol controller 25, as is known in the art for similar IC devices for communicating over a LIN data line.

Figure 4:
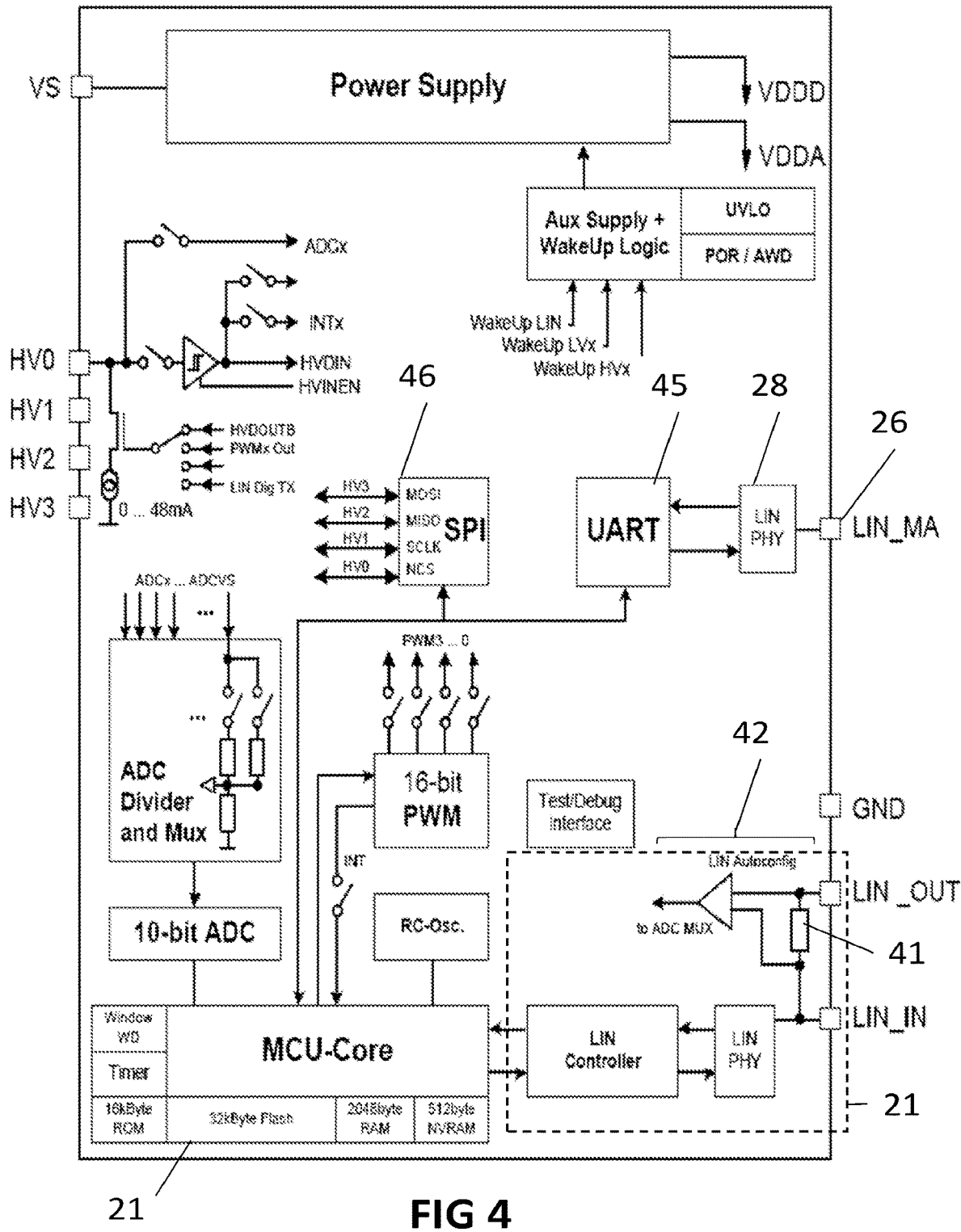
FIG. 4 shows, schematically, an exemplary device in accordance with embodiments of the present invention.

Furthermore, the slave node circuit 21 may comprise slave auto-addressing means 42, as known in the art, for enabling a unique identifier of the slave node circuit 21 to be determined for use in communication traffic over a data line connected to the first data line terminal 22. For example, as shown in FIG. 4, the slave node circuit 21 may comprise the first data line terminal 22 and a further data line terminal, respectively referred to as LIN_IN and LIN_OUT, in which a resistive element 41 may connect the first data line terminal 22 and the further data line terminal. Thus a daisy chain may be formed by connecting a plurality of the IC device 20 in accordance with embodiments (e.g. possibly in combination with other such devices adapted for implementing a LIN slave mode function) using a LIN_OUT on one device in the chain to a LIN_IN on a following device in the chain. Therefore, the slave node circuit 21 may be adapted for providing an auto-addressing mode as disclosed in the standard ISO 17987-3. For example, such auto-addressing means 42 may comprise the resistive element 41, e.g. a resistor, and an analogue to digital converter to evaluate a voltage drop over the resistive element 41. Furthermore, the processing unit 30 may be adapted for, e.g. programmed for and/or configured for, receiving a digital representation of this voltage drop and determining a network address in accordance. The auto-addressing means 42 may further comprise a differential amplifier for conditioning an analogue signal representative of the voltage drop over the resistive element for the analogue-to-digital converter. However, the auto-addressing means 42 may comprise any suitable means, known in the art, and associated functionality, for providing slave node position detection, e.g. for providing auto-addressing of the IC device 20 acting as a slave device on the first data line. For example, the auto-addressing means 42 may implement a slave node position detection in accordance with an extra wire daisy chain (XWDC) protocol, or a bus shunt method (BSM), e.g. as described in EP 1490772 and U.S. Pat. No. 7,091,876.

The IC device 20 also comprises a master node circuit 31, that comprises a second data line terminal 26 and a second LIN protocol controller 29 operably connected to the second data line terminal. This master node circuit 31 is adapted for processing further control signals to be transmitted in the form of LIN message frames via the second data line terminal 26 to the plurality of LIN slave nodes.

The master node circuit 31 may further comprise a second physical layer LIN transceiver 28 for interfacing between the second data line terminal 26 and the second LIN protocol controller 29, as is known in the art for similar IC devices.

Furthermore, the master node circuit 31 may be adapted for allowing the plurality of LIN slave nodes to be detected and/or assigned a network identifier automatically, e.g. to enable auto-addressing of the LIN slave nodes, when connected to the second data line terminal 26. Such methods for auto-addressing are known in the art, e.g. as specified in the standard ISO 17987-3, in EP 1490772 and/or in U.S. Pat. No. 7,091,876.

The second LIN protocol controller 29 may, for example, comprise a universal asynchronous receiver-transmitter (UART) block 45, which may, for example, provide full duplex asynchronous non-return-to-zero serial communication via the second data line terminal 26 (e.g. via the physical layer LIN transceiver 28). The second LIN protocol controller 29, e.g. the UART block 45, may provide, particularly, hardware support for operating as LIN master. For example, communication with the processing unit 30 may be provided by ports and an interrupt architecture. The UART module 45 may, for example, generate distinct interrupt signals for transmission, reception, and the LIN master function, in which these interrupt signals may be used by the processing unit, e.g. by software executing on the processing unit, to define the current state of the module.

Furthermore, the second LIN protocol controller 29 may comprise other features known in the art for LIN master controllers, e.g. a serial peripheral interface (SPI) block 46, e.g. for providing a full duplex operation of master and slave mode, processing interrupt signals, masking of interrupt signals, synchronization signal (SYNC) generation and/or SYNC shifting.

Furthermore, the IC device 20 comprises a processing unit 30 for controlling the plurality of LIN slave nodes based on the control signal, in which controlling the plurality of LIN slave nodes comprises composing the further control signals, e.g. composing each further control signal and providing this further control signal to the second LIN protocol controller 29 to be transmitted to the LIN slave node(s) for which this further control signal is intended.

Figure 3:
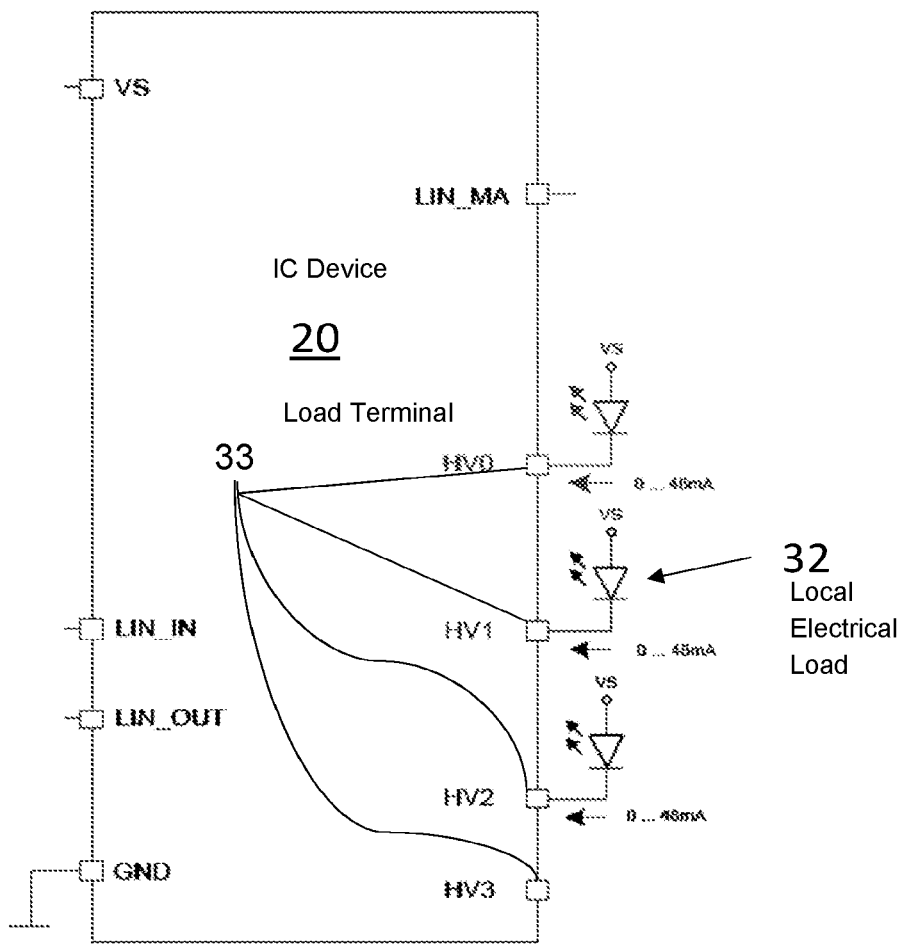
FIG. 3 shows an exemplary application diagram for a device in accordance with embodiments of the present invention, in which this device is adapted for driving at least one electrical load connected thereto.

The IC device 20 may also comprise at least one load terminal 33 for connecting to a local electrical load 32 to be controlled, e.g. to be controlled directly by the IC device, e.g. to be driven by the IC device. The processing unit 30 may thus be adapted for controlling a voltage and/or current to be supplied via the at least one load terminal in response to the control signal. For example, FIG. 3 shows an exemplary application diagram, embodiments of the present invention not being intended to be limited by this specific example. In embodiments of the present invention, the at least one load terminal 33 may, for example, be adapted for driving a light emitting diode (LED), e.g. for driving an LED light source for providing illumination in or on a vehicle.

However, applications of an IC device 20 in accordance with embodiments of the present invention are not limited thereto, e.g. the IC device 20 may comprise at least one load terminal 33 for connecting to a microactuator, e.g. to control throttle valves in a vehicle, or to a heating or cooler element, e.g. in a climate system of a vehicle.

For example, the IC device 20 may comprise at least three load terminals 33, for respectively driving three differently coloured LEDs, e.g. to provide a compound light source having a controllable colour, e.g. a controllable colour and brightness.

Thus, the IC device 20 may act, at least for specific predetermined control signals receivable from the LIN master control device, as a LIN slave device, e.g. the IC device 20 may locally and directly implement a predetermined control and/or sensor function, e.g. a lighting control or actuator control function, a pressure sensor function, or another function as known in the art for integrated circuits forming slave nodes on a LIN bus. However, the IC device 20 may also act as a gateway device for relaying network traffic, in unmodified, substantially unmodified or reprocessed form, from the LIN master control device to a plurality of LIN slave devices connected to the IC device 20 via the second data line terminal.

The processing unit 30 may be adapted for controlling a sensor and/or an electrical load connected to each of the plurality of LIN slave nodes. Such sensor or load to be controlled may be connected to the LIN slave node, or may be integrated in the LIN slave node.

For example, the processing unit may be adapted for controlling a sensor IC having a LIN interface module for communicating with the IC device 20 via the second data line terminal 26.

For example, the processing unit 30 is adapted for controlling at least one electrical load, connected to or integrated in the LIN slave nodes, such as an LED. For example, the processing unit 30 may be adapted for controlling three differently coloured LEDs, e.g. to provide a compound light source having a controllable colour, e.g. a controllable colour and brightness, that are attached to or integrated in each of the LI slave nodes. Thus, each LIN slave node may correspond to a LED light source for providing illumination in or on a vehicle.

Furthermore, the processing unit 30 may be adapted for analysing status information received from the plurality of LIN slave nodes via the master node circuit 31, and relaying this status information to the LIN master control device via the slave node circuit 21. For example, the status information may be retransmitted, substantially unchanged, to the master control device, and/or the processing unit 30 may process the status information received from the plurality of LIN slave nodes to compose a compound status message, e.g. to summarize the status information, before transmitting to the LIN master control device. It is an advantage that the IC device 20 may perform local processing of information, such as diagnostic information, relating to the slave nodes connected to the IC device 20, before sending this information to the LIN master control device, e.g. such as to distribute the computational load of processing this information.

The processing unit 30 may be, particularly, adapted for implementing at least a part of the network intelligence of the network formed by a connected master control device and slave nodes. For example, the processing unit 30 may comprise a programmable microprocessor and an electronic memory. Such microprocessor may be programmed for implementing part of the program logic that in a conventional network architecture would be handled exclusively by the master control device.

Figure 6:
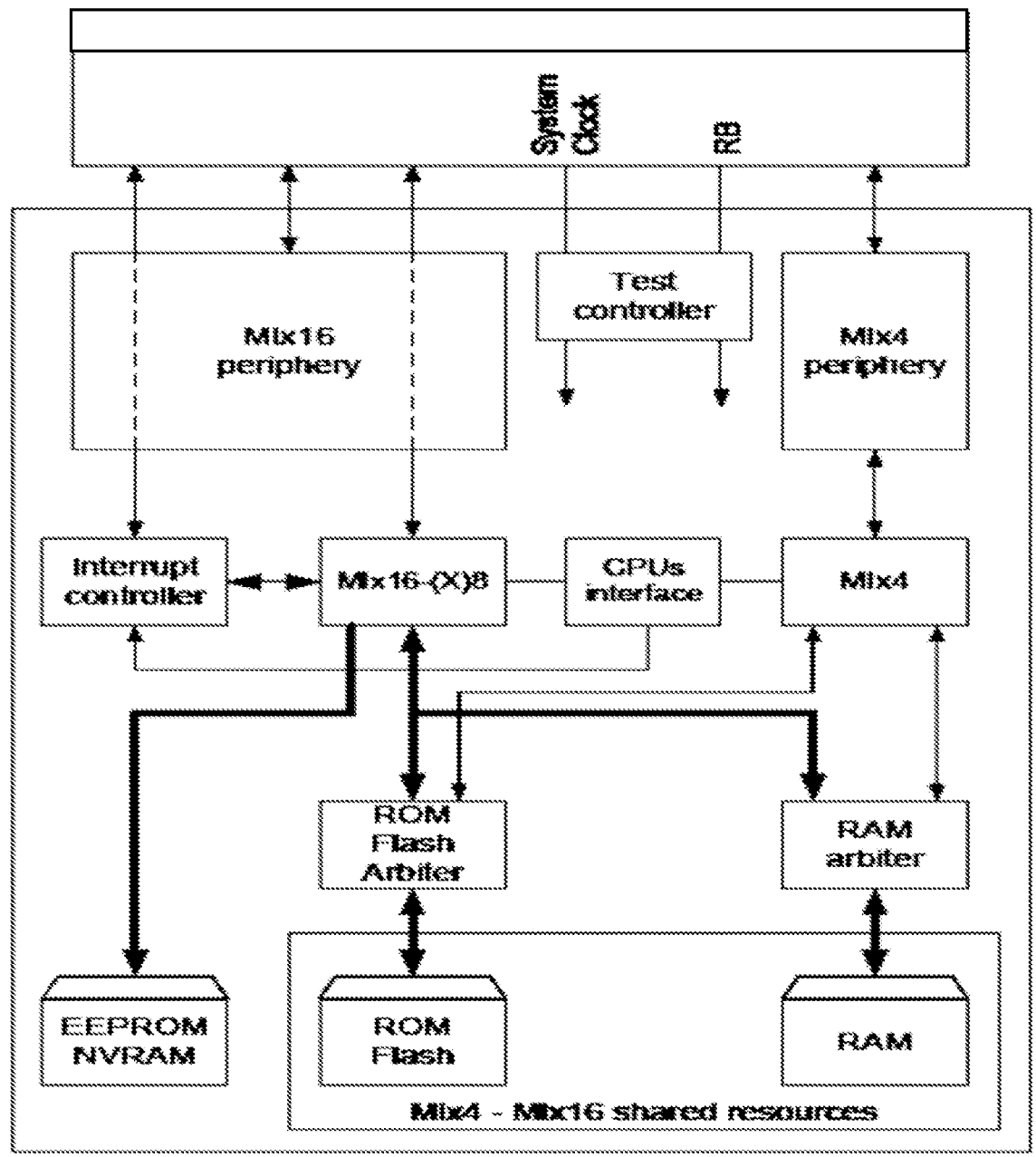
FIG. 6 illustrates an exemplary microprocessor architecture for use in a device in accordance with embodiments of the present invention.

For example, as shown in FIG. 4, and in detail in FIG. 6, the processing unit 30 may comprise a CPU architecture, e.g. an integrated Risc-CPU system, embodiments of the present invention not being limited by this example. Particularly, the processing unit 30 may comprise a random access memory RAM, a read-only memory, e.g. a flash-writable read-only memory ROM Flash, I/O connectors, and/or at least one general-purpose processing core. It shall be clear to the person skilled in the art that functionality of the first LIN protocol controller and/or the second LIN protocol controller can be implemented in part or fully in such processing unit 30.

In a second aspect, the present invention relates to a LIN bus system comprising a LIN bus and a plurality of nodes.

Figure 5:
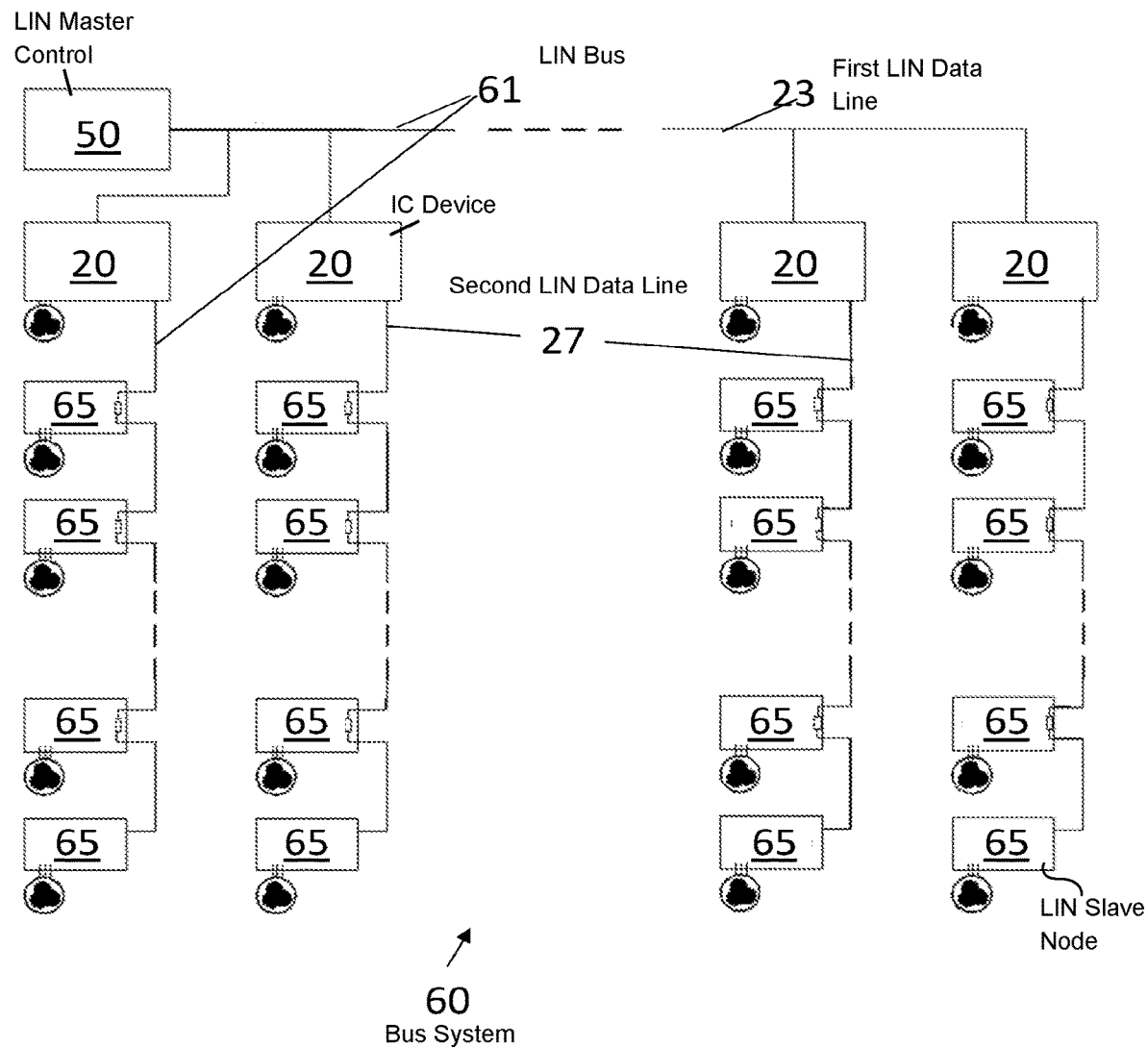
FIG. 5 shows a LIN system architecture, in accordance with embodiments of the present invention.

FIG. 5 shows an exemplary LIN bus system 60 in accordance with embodiments of the present invention. This LIN bus system 60, e.g. this LIN bus architecture, comprises a LIN bus 61 and a plurality of LIN nodes. The LIN bus may be segmented, e.g. may comprise a plurality of sub-buses 23,27. The plurality of nodes comprises a LIN master control device 50, and at least one integrated circuit device 20 in accordance with embodiments of the first aspect of the present invention. The plurality of nodes further comprises a plurality of LIN slave nodes 65. Furthermore, the plurality of nodes may comprise more than 16 nodes.

The plurality of nodes is connected to the LIN bus 61 such as to enable LIN message frames to be exchanged between the plurality of nodes.

The LIN master control device 50 is connected by a first LIN data line 23 to the at least one integrated circuit device 20, e.g. via the corresponding first LIN data line terminal 22.

The, or each of the, at least one integrated circuit device 20 is connected by a corresponding second LIN data line 27, e.g. via the corresponding second LIN data line terminal 26, to at least some of the plurality of LIN slave nodes 65.

The at least one integrated circuit device 20 and the plurality of LIN slave nodes 65 may each provide, individually, a predetermined sensor, actuation or electrical load driving function, e.g. may each directly control a LED, e.g. may each control three differently coloured lights. As such, a homogenous interface may be provided, where each such node can be connected by the same wiring diagram, regardless of the node being an IC device 20 or a slave node 65. Thus, a uniformity of wiring harness and network functionality can be achieved, e.g. each node, possibly exception the master control device 50, may be adapted for performing the same function, e.g. controlling a light source.

For example, a number of connected nodes may be easily adapted by including an IC device 20 accordance with embodiments as a slave node 65, and when the need arises, connecting a new local cluster of further slave nodes via the second data line terminal 26 of that IC device 20.

Thus, the LIN bus system 60 may form a distributed control arrangement for controlling a plurality of electrical loads, such as LEDs, via the slave nodes 65, e.g. via the slave nodes 65 and the IC device(s) 20. A plurality of the slave nodes 65 may be connected to the IC device 20, in which each slave node 65 locally controls a load and/or sensor. The IC device 20 may furthermore also locally control such a load and/or sensor. Such sensors may provide feedback signals to be processed locally in the slave node 65, to be transmitted to and processed by the IC device 20 and/or to be relayed via the IC device to the master control device 50 for processing. Each slave node 65 may comprise logic circuitry or program code for executing instructions specific to the operation of the load and/or sensor connected thereto.

In a third aspect, the present invention relates to a method for controlling a plurality of LIN slave nodes.

Such a method in accordance with embodiments of the present invention comprises transmitting, using a LIN master control device 50, a control signal in the form of a LIN message frame via a first LIN data line 23 to an integrated circuit device 20 having a slave node circuit 21, a master node circuit 31 and a processing unit 30, e.g. an IC device 20 in accordance with embodiments of the first aspect of the present invention.

The method further comprises processing, using the slave node circuit 21, the control signal and composing, using the processing unit 30, at least a further control signal in response to the control signal, e.g. determined by predetermined processing instructions in the IC device 20 in combination with characteristics, e.g. a data content, of the control signal.

The method also comprises transmitting, using the master node circuit 31, the at least one further control signal in the form of at least a further LIN message frame to the plurality of LIN slave nodes via a second LIN data line 27. This may comprise, for example, addressing one or a subset of the plurality of LIN slave nodes specifically and exclusively by such further LIN message frame, taking the processed control signal into account.

The method may further comprise a step of receiving, by the plurality of LIN slave nodes, e.g. by a LIN slave node specifically addressed by a further LIN message frame, the further control signal and controlling, by the LIN slave node, a corresponding electrical load connected to the LIN slave node in accordance with the further control signal.

The method may also comprise controlling an electrical load connected to the integrated circuit device 20 in accordance with the control signal, e.g. connected directly, e.g. connected such as to allow the electrical load to be driven without requiring further intermediate logic between the load and the integrated circuit device 20.

In a method in accordance with embodiments of the present invention, each electrical load connected to each LIN slave node and the electrical load connected to the integrated circuit device may have a similar or identical function, e.g. such as providing LED lighting.

It is an advantage of a device, system and/or method in accordance with embodiments of the present invention that an excessive number of wires can be avoided. It is another advantage that electromagnetic compatibility may be easier to ensure, e.g. electrical shorts and capacitive coupling between wires may be more easily avoided. While by replacing some, or even all, slave nodes by an IC device in accordance with embodiments, e.g. a gateway node, the complexity of this device may increase, e.g. due to the added interface and processing capabilities. However, this cost may be offset by the added benefit of allowing a flexible extension of the bus network to an arbitrary number of nodes, e.g. more than 16 nodes. It is a limitation of the LIN protocol, in accordance with its defining standards, as known in the art, that only 16 slave nodes can be implemented on the bus. Nevertheless, this can be overcome in accordance with embodiments of the present invention by providing each end device, e.g. each load or sensor to control, with a slave node and connecting such slave nodes in local clusters using an IC device in accordance with embodiments as a local master connected via a further bus to a global master device. It shall be appreciated by the skilled person that the number of hierarchical levels can be easily extended, e.g. instead, the IC device may be connected as slave to another IC device acting as master, while this other IC device may be connected as a slave to the master device, or even a yet further IC device in accordance with embodiments.

The invention claimed is:

1. An integrated circuit device for controlling a plurality of Local Interconnect Network (LIN) slave nodes based on a control signal transmitted by a LIN master control device, comprising:
   a slave node circuit comprising a first data line terminal for connecting to a first LIN data line and a first LIN protocol controller operably connected to said first data line terminal, said slave node circuit being adapted for processing said control signal when received in the form of a LIN message frame via said first data line terminal,
   a master node circuit comprising a second data line terminal for connecting to a second LIN data line and a second LIN protocol controller operably connected to said second data line terminal, said master node circuit being adapted for processing further control signals to be transmitted in the form of LIN message frames via said second data line terminal to said plurality of LIN slave nodes,
   a processing unit for controlling said plurality of LIN slave nodes based on said control signal, wherein said controlling of said plurality of LIN slave nodes comprises composing said further control signals for controlling an electrical load and/or a sensor function connected to, or integrated in, each of the plurality of LIN slave nodes in accordance with said further control signals, and
   at least one load terminal for connecting to a local electrical load to be controlled, said processing unit being furthermore adapted for controlling a voltage and/or current to be supplied via said at least one load terminal in response to said control signal.

2. The integrated circuit device in accordance with claim 1, wherein said at least one load terminal is adapted for driving at least one light emitting diode.

3. The integrated circuit device in accordance with claim 1, in which said processing unit is adapted for controlling at least one light emitting diode driven by each of said plurality of LIN slave nodes.

4. The integrated circuit device according to claim 1, wherein said slave node circuit further comprises a first physical layer LIN transceiver for interfacing between said first data line terminal and said first LIN protocol controller, and
   wherein said master node circuit further comprises a second physical layer LIN transceiver for interfacing between said second data line terminal and said second LIN protocol controller.

5. The integrated circuit device according to claim 1, wherein said processing unit is adapted for analysing status information received from said plurality of LIN slave nodes via said master node circuit, and relaying said status information to said LIN master control device via said slave node circuit.

6. The integrated circuit device according to claim 1, furthermore comprising a slave auto-addressing means for determining a unique identifier of the slave node circuit for use in communication traffic exchanged via said first data line terminal.

7. The integrated circuit device according to claim 1, wherein said master node circuit is adapted for allowing said plurality of LIN slave nodes to be detected and/or assigned a corresponding network identifier automatically.

8. A Local Interconnect Network (LIN) bus system comprising a LIN bus and a plurality of nodes;
   said plurality of nodes comprising a LIN master control device, at least one integrated circuit device according to claim 1, and a plurality of LIN slave nodes;
   said plurality of nodes being connected to said LIN bus such as to enable LIN message frames to be exchanged between said plurality of nodes;
   said LIN master control device being connected by a first LIN data line to said at least one integrated circuit device;
   the or each at least one integrated circuit device being connected by a corresponding second LIN data line to at least some of said plurality of LIN slave nodes.

9. The LIN bus system in accordance with claim 8, wherein said plurality of nodes comprises more than 16 nodes.

10. The integrated circuit device according to claim 1, wherein the second LIN protocol controller comprises a universal asynchronous receiver-transmitter (UART) block configured to provide full duplex asynchronous non-return-to-zero serial communication via the second data line terminal.

11. The integrated circuit device according to claim 1, wherein the second LIN protocol controller comprises a serial peripheral interface (SPI) block configured for providing a full duplex operation.

12. A method for controlling a plurality of Local Interconnect Network (LIN) slave nodes, the method comprising:
   transmitting, using a LIN master control device, a control signal in the form of a LIN message frame via a first LIN data line to an integrated circuit device having a slave node circuit, a master node circuit and a processing unit,
   processing, using said slave node circuit, said control signal and composing, using said processing unit, at least a further control signal in response to said control signal, wherein said further control signals are for controlling an electrical load and/or a sensor function connected to or integrated in, each of the plurality of LIN slave nodes in accordance with said further control signals
   transmitting, using said master node circuit, said at least one further control signal in the form of at least a further LIN message frame to said plurality of LIN slave nodes via a second LIN data line, and
   controlling an electrical load connected to said integrated circuit device via one load terminal in accordance with said control signal.

13. The method in accordance with claim 12, furthermore comprising a step of receiving, by said plurality of LIN slave nodes, said further control signal and controlling, by each of said plurality of LIN slave nodes, a corresponding electrical load connected to each LIN slave node in accordance with said further control signal.

14. The method of claim 13, wherein each of said electrical load connected to each LIN slave node and said electrical load connected to said integrated circuit device have a similar or identical function.

* * * * *